July 4, 1933.  J. J. BUCKLEY  1,916,253
DEVICE FOR ROTARY CUTTING AND THE LIKE
Original Filed Feb. 18, 1925
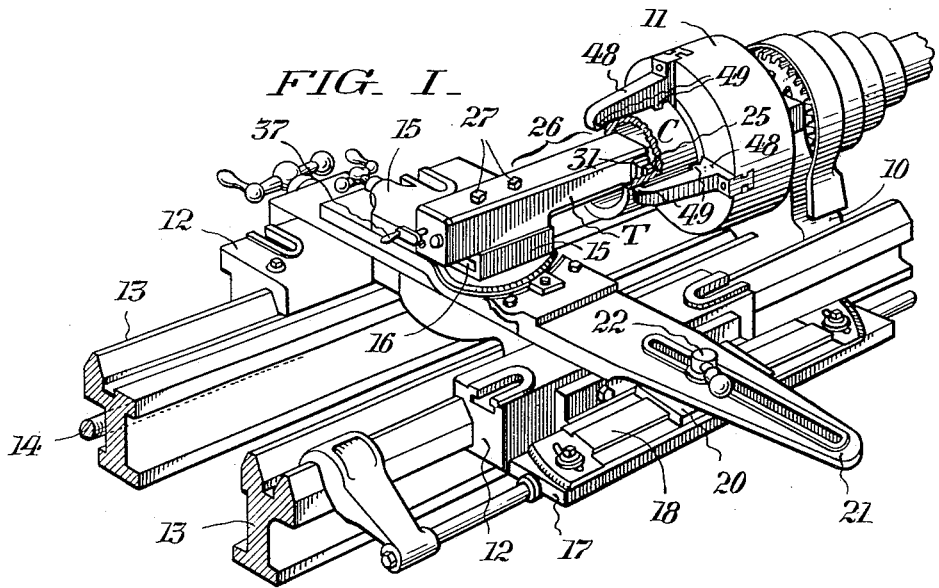
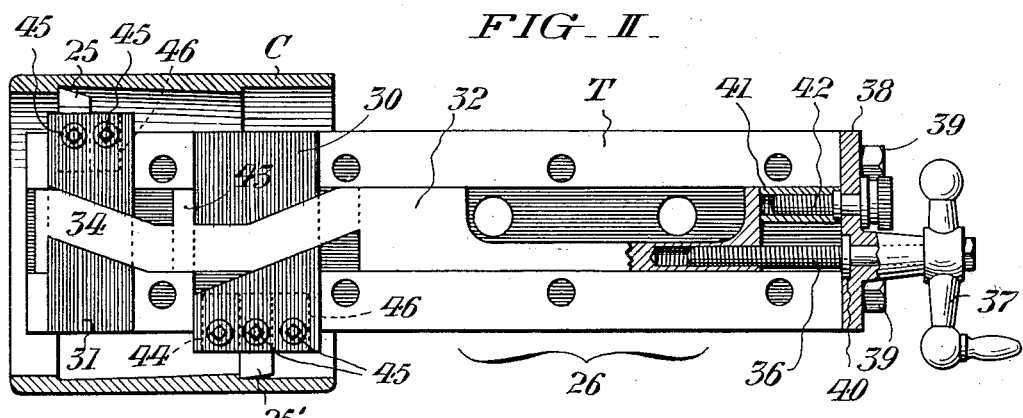
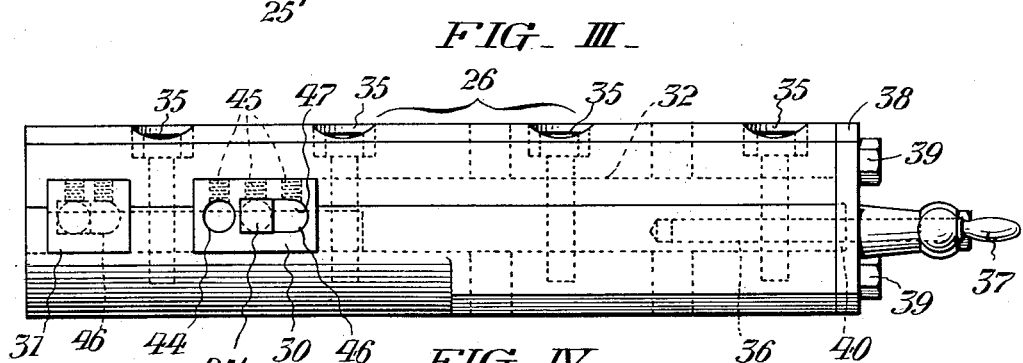
WITNESSES
INVENTOR:
John J. Buckley,
BY
ATTORNEYS.

Patented July 4, 1933

1,916,253

UNITED STATES PATENT OFFICE

JOHN J. BUCKLEY, OF CHESTER, PENNSYLVANIA

DEVICE FOR ROTARY CUTTING AND THE LIKE

Original application filed February 18, 1925, Serial No. 9,929. Divided and this application filed March 31, 1931, Serial No. 526,745. Renewed April 7, 1932.

My invention relates to tools or "boring bars" for rotary cutting operations and the like, such as boring, threading, and otherwise finishing pipe couplings, etc. The invention is especially convenient and advantageous in the case of "sleeve" couplings for large sizes of steel pipe, such as used for oil well casings, for example. This application is a division of my co-pending application Serial No. 9,929, filed February 18, 1925, entitled "Rotary cutting operations and apparatus therefor", now Patent No. 1,809,019, granted June 9, 1931.

Sleeve couplings such as hereinbefore mentioned commonly consist of tubular forgings, internally screwed to take the threaded ends of the pipe lengths that they are to connect. In general, the threaded pipe ends are externally tapered, and the coupling sleeve has a corresponding internal taper from either end. The coupling sleeve is not forged with such a taper, however, any more than with screw threads: on the contrary, both taper and threads are cut in the forged sleeve in a machine shop, by means of a lathe or other suitable machine. Usually, also, the end of the coupling sleeve is internally chamfered or counterbored to a larger diameter than that at the bottom of the screw-threads, to protect the beginning of the threads and thus facilitate engagement of the pipe end with them.

For the operations above indicated, the blank forging is held clamped by one end in a revolving work-holder, and suitable tools or cutters are employed to bore out its other (exposed) end to the proper taper, to chamfer or counter-bore it, and to thread it. When one end of the blank has been operated on, it is turned end for end and reclamped in the holder, and the other end then operated on. As some time is required to set up and adjust the different tools employed for boring, counter-boring, and threading, and as the setting and adjustment would necessarily be lost if one tool were substituted for another in a machine, it is customary to perform the various operations in different machines, each kept set up with one tool until an entire batch or lot of similar couplings has been run through it.

The disadvantage of thus using some three machines on one job (especially if it be a small job) is quite obvious. However, the method above outlined is subject to much more serious drawbacks.

While the tapered threads in the two ends of a coupling must be substantially or very approximately coaxial, so that the pipe lengths connected by them shall be in proper axial alignment, such forgings are seldom or never truly circular, or even uniform from end to end, either internally or externally. Not only, therefore, is it often rather hard to center a coupling satisfactorily in the workholder for boring the first end; but after one end has been bored, the workman often fails to center the coupling satisfactorily for the boring of its other end, so that the two taper borings shall be in proper alignment. Sometimes this failure is due to unskillfulness or error of judgment; in other cases, the irregularities of the forging are such that if aligned with the first boring, the second would leave the walls of the coupling too thin somewhere. At best, the centering of the coupling in the work holder is a tedious "cut-and-try" operation, generally consuming a great deal of time.

As a result of these difficulties, many couplings have to be rejected by inspectors after considerable machine work has been done on them; and thus the machinist's time on them becomes a dead loss, as well as the forging itself. Even in good shops, such losses average from 40 to 50 per cent of the forged blanks worked on; hence it is a serious item in the real cost of the usable couplings turned out.

My novel method of boring, etc., as described in my above-cited application, affords a means of obviating such drawbacks of present practice, greatly reducing the time required to bore and thread couplings, assuring proper alignment as between the two ends of a coupling, without trouble or loss of time in centering, and avoiding or minimizing losses from imperfect centering or from mis-alignment. It can be carried out with standard machines, such as are already in use for boring and threading couplings, practically without alteration of such machines. The tool of my present invention is especially adaptable and advantageous for the practice of the method set forth in my said application, as will appear from the description of its use for this purpose hereinafter.

In the drawing, Fig. I is a fragmentary perspective view of the head-stock, bed, and associated parts of a screw-cutting engine lathe, illustrating its employment for the purpose of my invention, and showing a coupling being operated on partly broken away and in longitudinal mid-section.

Fig. II is a plan view of the boring bar shown in Fig. I, with certain parts removed and others partly broken away and in section.

Fig. III is a side view of the boring bar; and,

Fig. IV is a fragmentary plan view illustrating the substitution of screw-threading tools for the cutting tools shown in Figs. I–III.

Fig. I illustrates a lathe of ordinary type and construction, comprising a head-stock 10, revolving work-holder 11 in the form of a three-jaw universal chuck (preferably of pneumatic type), carriage 12 slidable along ways 13 extending parallel with the axis of rotation of the work holder 11, as usual, and a lead-screw 14 for feeding the carriage 12 along the ways 13 at uniform rate, as for screw-cutting. The carriage 12 is shown equipped with the usual compound rest 15, shiftable thereon angularly and also transversely of the ways 13. As shown, the rest 15 has the usual undercut groove 16 for the attachment of a tool post or the like thereto. The lathe is shown equipped with a standard type of taper attachment 17, comprising a guide 18 angularly adjustable to any desired inclination relative to the ways 13, a grooved slide block 20 engaging the guide 18, and a connection from the slide 20 to the rest 15 including a slotted member 21 and a screw clamp 22 for securing the member 21 to the slide 20, so that the rest 15 may have any desired range of movement relative to the carriage 12.

It will be seen that with suitable adjustment of the guide 18, the rest 15 can be fed transversely of the ways 13 in any desired ratio to the movement of the carriage 12 along them; or, in other words, the rest 15 can be fed obliquely along and transversely of the ways 13 (and of the axis of rotation of the work-holder 11) at any desired angle. With my boring bar T mounted on the rest 15 as shown in Fig. I, opposite tapers can be cut in the two ends of a coupling C as a result of the compound bodily movement of the rest and the bar, along and across the lathe ways 13.

My boring bar T here illustrated provides for operating on the two ends of the coupling concurrently, by means of tools 25, 25' (Figs. I and II) suitably spaced in the direction of the axis of rotation of the workholder 11, one in advance of the other, and moving in the same direction therealong (toward the left in Fig. II), preferably at opposite sides of the axis of rotation. While the oppositely pointing tools 25, 25' need not necessarily be in a common horizontal axial plane, as shown, yet they should, of course, occupy such positions that their radial distances from the work holder axis vary oppositely as the carrier moves along and across the lathe ways 13. With this arrangement, one tool 25'—for example—begins at the outer end of the coupling C and cuts on a diminishing taper inward from the outer end (speaking with reference to the relations of the coupling C to the work-holder 11) toward the middle of the coupling, while the other tool 25 begins about at (or outside of) the middle of the coupling C and cuts on an enlarging taper inward toward the inner end of said coupling, all as indicated in Fig. II. As shown to better advantage in Figs. II and III, the tools 25, 25' are carried by a tool head or bar 26 which is clamped by bolts 27, to the rest 15, in place of the usual tool post or the like. After the ends of the coupling C have been bored out tapering with cutters 25, 25', such as shown in Figs. II and III, these cutters may be replaced with chasing cutters such as shown at 25b in Fig. IV, and the two ends of the coupling C concurrently threaded in a similar manner. The reversely tapered threads thus formed in the opposite ends of the coupling C are truly coaxial and similar to one another. The ends of the coupling C may then be chamfered or counter-bored as usual, and also tapped, if desired, to finish and perfect their threads.

Owing to the pressure necessarily exerted by the work or coupling C on the tools 25, 25' during their cut, they tend to touch and scrape the metal if returned past it by reverse movement in the same path. To obviate necessity of revolving the work or coupling C and slowly backing the cutters 25, 25' out of it in order to avoid mutilation of the work in the withdrawal, I prefer to provide for retracting said cutters oppositely at the end of their working cut, so as to make them clear the work or coupling C completely and to allow the bar 26 to be withdrawn from said work without any necessity for revolving the latter.

For this purpose, the cutters 25, 25' may be mounted in carrier slides or holders 30, 31 shiftable across the bar 26 in transverse guideways, in overlapping relation to one another and in a diametrical plane, by means of an actuating member 32 movable lengthwise of said bar in a corresponding guideway or channel therein. As shown in Fig. II, the member 32 has oppositely inclined cam portions 33, 34 which engage in correspondingly inclined lateral grooves in the overlapping portions of the cutter holders 30, 31, and thus shift them oppositely and concurrently, in or out of the bar 26, when the member 32 is moved one way or the other lengthwise of said bar. As here shown, the bar 26 is constructed in upper and lower halves clamped together by bolts 35, and the guideways for the parts 30, 31 and 32 are formed partly in the upper and partly in the lower halves of said bar. The actuating member 32 may be shifted as desired by means of a feed screw 36 provided with an operating handle-crank 37. The screw 36 is rotatable in a bearing on a plate 38 removably secured to the end of the bar 26 by bolts 39, but is kept from being pushed outward through the plate 38 by a collar or flange 40. A stop 41 adjustable by means of a screw 42 similarly mounted in the plate 38 cooperates with the end of the member 32 to determine the normal cutting position of the cutters 25, 25', the adjustment taking care of variations in sizes of couplings C within the capacity of the tool. A stop lug 43 on the member 32 between the cutter holders 30, 31 coacts with the latter to limit the possible range of movement of the member 32 and of said cutter holders.

As shown in Figs. II and III, the holder 30 has a round socket-hole 44 to take a round cutter shank, with a key-socketed set screw 45 for securing the latter, and also a horizontally elongated round-sided "double" socket 46 with a pair of set-screws 45, 45 for securing a round cutter shank and a spacing block 47 with convex and concave sides corresponding in curvature to the sides of said socket and of the cutter shank. The holder 31 has a similar double socket 46. Thus the cutters 25, 25' can be mounted in practically any relative positions desired along the bar 26, according to the requirements of different couplings.

The work-holder ordinarily used for boring and threading couplings is of the "independent" type, usually consisting of three set-screws in the wall of a sleeve or flange. The holder 11 here shown, however, is a three-jaw universal chuck, with jaws convergently movable to grip the periphery of the coupling C, as mentioned above. Instead of the usual short jaws, bearing their full lengths on one end only of the coupling C, the chuck 11 shown in Fig. I has long jaws 48 extending substantially the full axial length of the coupling C, but bearing on the latter only adjacent its ends, as indicated at 49. This makes it possible to properly center and align in the chuck 11 any coupling C not so obviously imperfect that it should be rejected by the machinist, without any attempt to work on it, if such a coupling C should by any accident pass inspection at the forging plant. With such a universal chuck 11, the centering of the coupling C required only a few seconds, as against many minutes often required in repeatedly centering couplings in ordinary work-holders such as above mentioned.

Having thus described my invention, I claim:

1. A boring tool head or bar having carriers for oppositely pointing cutters one in advance of the other, movable transversely of the bar, and an actuator member movable lengthwise of the bar having inclined cam faces at different positions in its length for cooperating with said carriers to move them positively both ways.

2. A boring tool head or bar having a pair of cutting tools one in advance of the other movable transversely of the bar in a diametral plane, a pair of slides carrying said tools and slidingly supported by the head in overlapping relation to one another, and a cam member in the head cooperating with the overlapping portions of the slides and adapted to move them transversely when the cam member and the head move relative to one another.

3. A boring device comprising a bar with holders for oppositely pointing cutters at different positions in its length for operating in opposite ends of a coupling, an actuator member having opposedly-inclined cam faces serving when said member is moved lengthwise of the bar to cooperate with said cutter holders to positively move them transversely both ways into and out of the bar, and stop means to limit the range of movement of the actuator member and cutter holders.

4. A boring device comprising a bar with holders for oppositely pointing cutters at different positions in its length for operating in opposite ends of a coupling, an actuator member with oppositely inclined cam portions engaged with said holders so as to move them transversely both ways, into and out of the bar, a stop lug on the actuator member intermediate the cutter holders to limit the range of movement of the latter as well as that of said member, and an adjustable stop at the outer end of the bar to determine the normal cutting position of the cutters as well as to accommodate variations in the size of couplings operable upon within the capacity of the tool.

In testimony whereof, I have hereunto signed my name at Philadelphia, Pennsylvania, this 28th day of March, 1931.

JOHN J. BUCKLEY.